(12) United States Patent
Harbers et al.

(10) Patent No.: US 8,421,952 B2
(45) Date of Patent: Apr. 16, 2013

(54) ILLUMINATION MODULE FOR SECTIONAL ILLUMINATION

(75) Inventors: Gerard Harbers, Sunnyvale, CA (US); Takaaki Yagi, Saitama (JP); Johannes W. H. S. Smitt, San Jose, CA (US); Serge J. Bierhuizen, Santa Rosa, CA (US)

(73) Assignee: Philips Lumileds Lighting Company, LLC, San Jose, CA (US)

(*) Notice: Subject to any disclaimer, the term of this patent is extended or adjusted under 35 U.S.C. 154(b) by 86 days.

(21) Appl. No.: 11/949,697

(22) Filed: Dec. 3, 2007

(65) Prior Publication Data

US 2009/0141212 A1 Jun. 4, 2009

(51) Int. Cl.
*G02F 1/1335* (2006.01)
*G02F 1/1333* (2006.01)

(52) U.S. Cl.
USPC .............. 349/61; 349/56; 349/113; 362/97.1; 362/97.2

(58) Field of Classification Search .............. 349/61–64, 349/68, 69, 56, 113; 362/97.1, 97.2
See application file for complete search history.

(56) References Cited

U.S. PATENT DOCUMENTS

| | | | |
|---|---|---|---|
| 6,448,951 B1* | 9/2002 | Sakaguchi et al. | 345/88 |
| 7,896,514 B2 | 3/2011 | Gomi | |
| 2001/0017774 A1* | 8/2001 | Ito et al. | 362/31 |
| 2002/0167624 A1* | 11/2002 | Paolini et al. | 349/61 |
| 2004/0061814 A1* | 4/2004 | Kim et al. | 349/65 |
| 2006/0092666 A1* | 5/2006 | Jeong et al. | 362/613 |
| 2006/0152931 A1* | 7/2006 | Holman | 362/297 |
| 2006/0193148 A1* | 8/2006 | Bang | 362/607 |
| 2006/0215387 A1* | 9/2006 | Wang et al. | 362/29 |
| 2006/0221638 A1* | 10/2006 | Chew et al. | 362/613 |
| 2006/0285326 A1* | 12/2006 | Jeon | 362/247 |
| 2007/0001185 A1* | 1/2007 | Lu et al. | 257/98 |
| 2007/0019435 A1* | 1/2007 | Sakurai et al. | 362/611 |
| 2007/0091641 A1* | 4/2007 | Lin et al. | 362/615 |
| 2007/0126948 A1* | 6/2007 | Kim et al. | 349/61 |
| 2007/0147075 A1* | 6/2007 | Bang | 362/609 |
| 2009/0141212 A1 | 6/2009 | Harbers et al. | |
| 2009/0257215 A1* | 10/2009 | Gomi | 362/97.1 |

FOREIGN PATENT DOCUMENTS

| | | |
|---|---|---|
| EP | 1684111 A1 | 7/2006 |
| WO | 2008013072 A1 | 1/2008 |

* cited by examiner

*Primary Examiner* — Brian Healy
*Assistant Examiner* — Mary A El-Shammaa

(57) ABSTRACT

A backlight for a display includes a plurality of illumination modules, each illumination module including a light source and a reflective member. A portion of the reflective member is disposed over the light source. A liquid crystal display panel is disposed over the plurality of illumination modules. The reflective member is configured such that a majority of light from the light source is directed parallel to the liquid crystal display panel, to provide uniform illumination of the liquid crystal display panel. In some embodiments, the light source is at least one semiconductor light emitting diode.

25 Claims, 3 Drawing Sheets

ILLUMINATION MODULE FOR SECTIONAL ILLUMINATION

BACKGROUND

1. Field of Invention

This invention relates to a module for illumination, which may be combined with a semiconductor light emitting device and used as a backlight for a liquid crystal display.

2. Description of Related Art

Semiconductor light emitting devices such as light emitting diodes (LEDs) are among the most efficient light sources currently available. Material systems currently of interest in the manufacture of high brightness LEDs capable of operation across the visible spectrum include group III-V semiconductors, particularly binary, ternary, and quaternary alloys of gallium, aluminum, indium, and nitrogen, also referred to as III-nitride materials; and binary, ternary, and quaternary alloys of gallium, aluminum, indium, arsenic, and phosphorus. Often III-nitride devices are epitaxially grown on sapphire, silicon carbide, or III-nitride substrates and III-phosphide devices are epitaxially grown on gallium arsenide by metal organic chemical vapor deposition (MOCVD), molecular beam epitaxy (MBE), or other epitaxial techniques. Often, an n-type region is deposited on the substrate, then an active region is deposited on the n-type region, then a p-type region is deposited on the active region. The order of the layers may be reversed such that the p-type region is adjacent to the substrate.

One promising use of semiconductor light emitting devices is for backlights in liquid crystal displays (LCDs). For full color displays, the light used to illuminate the display generally has red, green, and blue components. A combination of red, green, and blue LEDs may be used, or blue or UV LEDs combined with wavelength-converting material such phosphor may be used, such that the resulting combined light appears white.

SUMMARY

In accordance with embodiments of the invention, a backlight for a display includes a plurality of illumination modules, each illumination module including a light source and a reflective member. A portion of the reflective member is disposed over the light source. A liquid crystal display panel is disposed over the plurality of illumination modules. The reflective member is configured such that a majority of light from the light source is directed parallel to the liquid crystal display panel, to provide uniform illumination of the liquid crystal display panel. In some embodiments, the light source is at least one semiconductor light emitting diode.

Such a backlight is inexpensive to manufacture, and is easily scaled by adding or subtracting illumination modules. In addition, the amount of power supplied to each illumination module may be adjusted based on the image displayed, such that more power is supplied to illumination modules lighting brighter parts of the image, and less power is supplied to illumination modules lighting darker parts of the image, potentially reducing power consumption and improving the contrast of the projected image.

DETAILED DESCRIPTION

Figure 1:
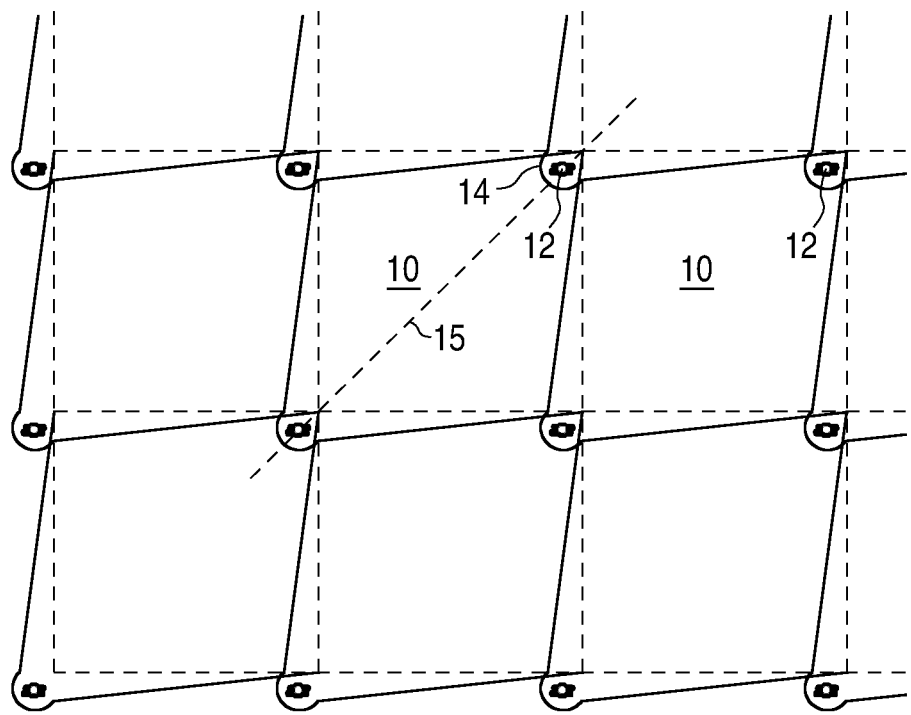
FIG. 1 is a plan view of a group of illumination segments.
Figure 2:
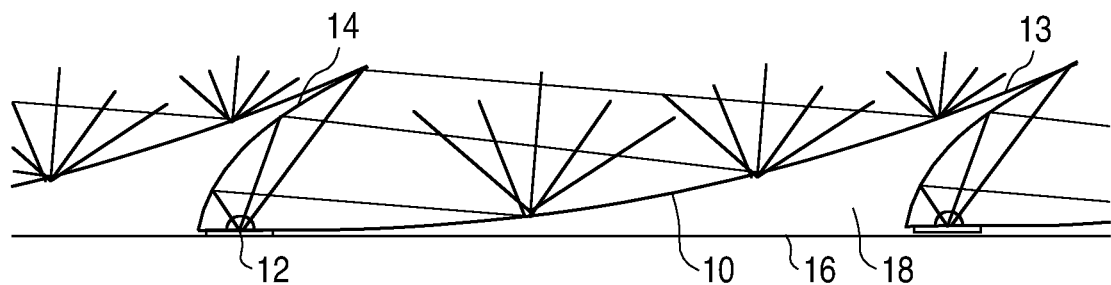
FIG. 2 is a cross sectional view of an arrangement of illumination segments.

FIG. 1 is a top view of a group of illumination segments or modules. FIG. 2 is a cross sectional view of a group of illumination segments along axis 15 shown in FIG. 1. Each segment is lit by a light source 12. In general, light source 12 is a single LED, though more than one LED or any other suitable light source may be used. For example, each segment may be lit by a single phosphor-converted LED that emits white light, or each segment may be lit by multiple LEDs selected to achieve desired luminance, contrast, color gamut. For example, each segment may be lit by a combination of red, green, and blue LEDs, arranged for example in a cluster disposed in a corner or in a row disposed on an edge of a segment. A single LED may be placed in a corner of each segment, as illustrated in FIG. 1, along a side of the segment, or in any other suitable location in the segment.

The number of segments in the backlight depends on the size of the backlight, the required brightness, and the desired cost. For a given display size, the benefits of using more segments include higher brightness and contrast range, while the benefits of using fewer segments include reduced cost and power consumption. As an example, a backlight for an LCD monitor may use on the order of a hundred segments, though smaller backlights with fewer segments are within the scope of the invention.

In FIG. 1 each of the segments is the same size and shape. For example, each segment may be square, 50 to 100 mm on a side. In some embodiments, the size and shape of individual segments may be selected to create a particular brightness profile. For example, the segments may increase in size from the smallest segments near the center of the backlight to larger segments near the edges of the backlight.

Each segment includes a reflective member 10. Reflective member 10 may be, for example, a sheet of reflective material, such as E60L, a white diffuse reflective material available from Toray, or a reflective metal such as Miro, a highly reflective enhanced aluminum mirror available from Alanod.

Reflective member 10 is shaped to hide light source 12 from direct view when viewed from the front of the backlight, and to reduce or eliminate a visible edge between the segments, when viewed from the front of the backlight. For example, as illustrated in FIG. 2, a portion of reflective member 14 may be shaped to reflect downward light emitted from light source 12. Portion 13 of reflective member 10 may overlap portion 14 of the adjacent segment.

Individual segments may be formed by mounting light source 12 on reflective member 10, then shaping reflective member 10 into the desired shape. The reflective members of adjacent segments can be welded or glued together and attached to a mount 16, for example by welding or by adhesive disposed in cavities 18. The segments may be, for example, less than 20 mm thick, more preferably less than 15 mm thick.

Figure 3A:
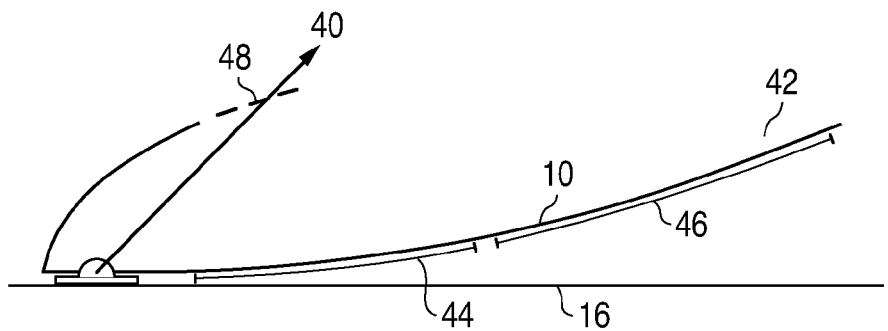
FIGS. 3A, 3B, and 3C illustrate different shapes for the reflective member in an illumination segment.
Figure 3B:
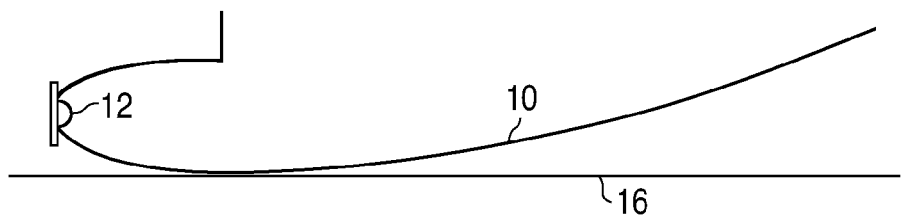
Figure 3C:
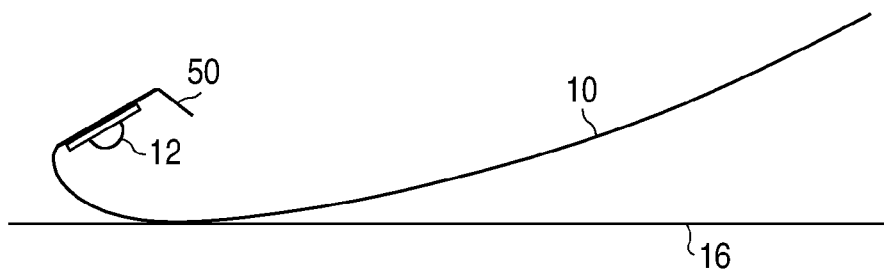

Reflective member 10 may be shaped and positioned such that light source 12 rests on mount 16, as illustrated in FIG. 3A. In alternative embodiments, as illustrated in FIGS. 3B and 3C, the light source 12 does not rest on mount 16. Reflective member 10 may serve as a heat sink for light source 12.

In some embodiments, light source 12 is configured such that, in combination with reflective member 10, most of the light is emitted in a direction parallel to mount 16. LED light sources may be configured to extract a majority of light from the side of the device, for example by using a lens as described in U.S. Pat. No. 6,598,998, or by using a reflector as described in U.S. application Ser. No. 11/423,419. Both U.S. Pat. No. 6,598,998 and U.S. application Ser. No. 11/423,419 are incorporated herein by reference. Alternatively, LED light sources may be configured to extract a majority of light from the top of the device, in a substantially Lambertian pattern. Such light sources may use a secondary optical element, such as a transparent optical material which uses refraction, or a reflective element, to direct light in a parallel direction. In some embodiments such as the embodiments illustrated in FIGS. 3A, 3B, and 3C, a light source emitting light in a substantially Lambertian pattern is combined with a reflective element configured to emit at least 80% of the light within an angle +/− arctan (T/W), where T is the thickness of the backlight and W is the width of a segment.

As illustrated in FIG. 3A, when viewed from above, a bright spot 40 from light source 12 may be visible, while the edge 42 of the segment is not as bright. The appearance of bright spot 40 and dark region 42 may be reduced by designing the illumination segment such that more light is focused far from light source 12 than near light source 12. An optional transparent or semi-transparent material 48 may be disposed at the edge of the part of reflective member 10 located over light source 12.

Reflective member 10 may be specular reflecting in a region 44 close to light source 12 and diffuse reflecting in a region 46 far from light source 12. Specular region 44 and diffuse region 46 may be distinct regions, as illustrated in FIG. 3A. Alternatively, the optical properties of reflective member 10 may be varied from mainly specular reflecting in areas close to light source 12 to mainly diffuse reflecting in areas far from light source 12. The diffusivity of reflective member 10 may be varied by, for example, screen printing white dots on reflective member 10, or by corrugating reflective member 10 in a region far from lights source 12.

The illumination segment illustrated in FIG. 3C can be configured to have no direct light emission, by adding optional edge 50, which reflects side light from light source 12. optional edge 50 may be the same material as the rest of reflective member 10. As described above in reference to FIG. 3A, reflective member 10 may be specular reflecting in a region close to light source 12 and diffuse reflecting in a region far from light source 12.

Figure 4:
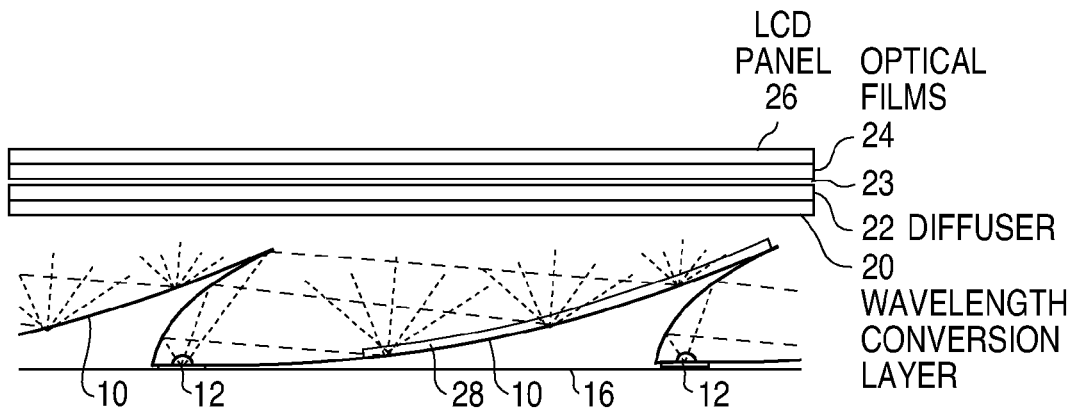
FIG. 4 is a cross sectional view of an arrangement of illumination segments including at least one wavelength converting material.

FIG. 4 is a cross sectional view of a portion of an LCD display. Light for the display is provided by illumination segments according to embodiments of the invention. As described above, in each segment, a light source 12 is disposed in a cavity formed by a reflective member 10. Reflective members are mounted on a mount 16. Disposed over the backlight are conventional layers such as an optional diffuser 22 in embodiments where improved brightness uniformity is required; one or more optical films 24 such as a reflective polarizer or a brightness enhancement film; and LCD panel 26. Diffuser 22 may be patterned to improve uniformity. In some embodiments, a gap 23 is formed between diffuser 22 and optical films 24, to reduce the appearance of the edges of individual illumination segments.

In some embodiments, the illumination segments are configured such that a portion of the light emitted from a given segment may be incident on a portion of LCD panel 26 corresponding to a neighboring segment. The amount of overlap of light from neighboring segments may be controlled by the spacing between the illumination modules and diffuser 22. For example, diffuser 22 may be spaced between 0.5 and 10 mm from the top surface of the illumination modules. In some embodiments, between 5% and 60% of the light incident on a part of LCD panel 26 corresponding to a particular illumination segment may be emitted by other illumination segments.

The display illustrated in FIG. 4 may include one or more optional wavelength converting layers. Wavelength converting layer 20 may be formed as a planar layer disposed between or on a surface of diffuser 22 and optical films 24. Wavelength converting layer 28 may be disposed on all or a portion of reflective member 10. Each wavelength converting layer may include a single or multiple wavelength converting materials such as phosphor that convert light to one or more different wavelengths. The different wavelength converting layers may be used separately or together and may be used with a wavelength-converted light source or a non-wavelength-converted light source.

In some embodiments, an LED light source that emits blue light is combined with a single wavelength converting layer including a yellow-emitting phosphor disposed either on reflective member 10 or disposed over the illumination segments. In some embodiments, an LED light source that emits blue light is combined with both green-emitting phosphor and red-emitting phosphor. The green- and red-emitting phosphors may be mixed and formed in a single wavelength converting layer disposed either on reflective member 10 or disposed over the illumination segments. Alternatively, the red-emitting phosphor may be disposed on reflective member 10 and the green-emitting phosphor may be disposed over the illumination segments, or vice versa. In some embodiments, an LED light source that emits UV light is combined with blue-, green-, and red-emitting phosphors.

Wavelength converting layers 20 and 28 may be, for example, ceramic layers, or a powder phosphor layers formed by stenciling, screen printing, or electrophoretic deposition. A wavelength converting layer need not be uniform. For example, a wavelength converting layer 28 may be screen printed dots of one or more types of phosphor. The dots may vary in size and density. Dots of a material that is not wavelength-converting, such as white diffusing dots, may be included as well. Factors such as the thickness of the wavelength converting layer, the arrangement and placement of the wavelength converted layer, and the concentration of phosphor may be selected to achieve a particular fraction of wavelength-converted light.

Suitable yellow/green emitting phosphors include aluminum garnet phosphors with the general formula $(Lu_{1-x-y-a-b}Y_xGd_y)_3(Al_{1-z}Ga_z)_5O_{12}:Ce_aPr_b$ wherein $0<x<1$, $0<y<1$, $0<z\leq0.1$, $0<a\leq0.2$ and $0<b\leq0.1$, such as, for example, $Lu_3Al_5O_{12}:Ce^{3+}$ and $Y_3Al_5O_{12}:Ce^{3+}$; $(Sr_{1-a-b}Ca_b Ba_c)Si_xN_yO_z:Eu_a^{2+}$ wherein a=0.002-0.2, b=0.0-0.25, c=0.0-0.25, x=1.5-2.5, y=1.5-2.5, z=1.5-2.5 such as, for example, $SrSi_2N_2O_2:Eu^{2+}$; $(Sr_{1-u-v-x}Mg_uCa_vBa_x)(Ga_{2-y-z}Al_yIn_zS_4):Eu^{2+}$ such as, for example, $SrGa_2S_4:Eu^{2+}$; and $Sr_{1-x}Ba_xSiO_4:Eu^{2+}$. Suitable red-emitting phosphors include eCAS, BSSNE, SSONE, as well as $(Ca_{1-x}Sr_x)S:Eu^{2+}$ wherein $0<x\leq1$ including, for example, $CaS:Eu^{2+}$ and $SrS:Eu^{2+}$; and $(Sr_{1-x-y}Ba_xCa_y)_{2-z}Si_{5-a}Al_aN_{8-a}O_a:Eu_z^{2+}$ wherein $0\leq a<5$, $0<x\leq1$, $0\leq y\leq1$, and $0<z\leq1$ including, for example, $Sr_2Si_5N_8:Eu^{2+}$. eCAS, which is $Ca_{1-x}AlSiN_3:Eu_x$ may be synthesized from 5.436 g $Ca_3N_2$ (>98% purity), 4.099 g AlN (99%), 4.732 g $Si_3N_4$ (>98% purity) and 0.176 g $Eu_2O_3$ (99.99% purity). The powders are mixed by planetary ball milling, and fired for 4 hours at 1500° C. in $H_2/N_2$ (5/95%) atmosphere. BSSNE, which is $Ba_{2-x-z}M_xSi_{5-y}Al_yN_{8-y}O_y:Eu_z$ (M=Sr, Ca; $0 \leq x \leq 1$, $0 \leq y \leq 4$, $0.0005 \leq z \leq 0.05$), may be synthesized by carbothermal reduction, which includes mixing 60 g $BaCO_3$, 11.221 g $SrCO_3$ and 1.672 g $Eu_2O_3$ (all 99.99% purity) by planetary ball milling using 2-propanol as dispersing agent. After drying, the mixture is fired in forming gas atmosphere at 1000° C. for 4 hours and 10 g of the thus obtained $Ba_{0.8}Sr_{0.2}O$:Eu (2%) are mixed with 5.846 g $Si_3N_4$ (>98% purity), 0.056 g AlN (99% purity) and 1.060 g graphite (microcrystal grade). The powders are thoroughly mixed by 20 minutes of planetary ball milling and fired for 4 hours at 1450° C. in a forming gas atmosphere to obtain a powder of $Ba_{2-x-z}M_xSi_{5-y}Al_yN_{8-y}O_y$:$Eu_z$ (M=Sr, Ca; $0 \leq x \leq 1$, $0 \leq y \leq 4$, $0.0005 \leq z \leq 0.05$). SSONE may be manufactured by mixing 80.36 g $SrCO_3$ (99.99% purity), 20.0 g $SiN_{4/3}$ (>98% purity) and 2.28 g $Eu_2O_3$ (99.99% purity) and firing at 1200° C. for 4 hour in a $N_2/H_2$ (93/7) atmosphere.

Figure 5:
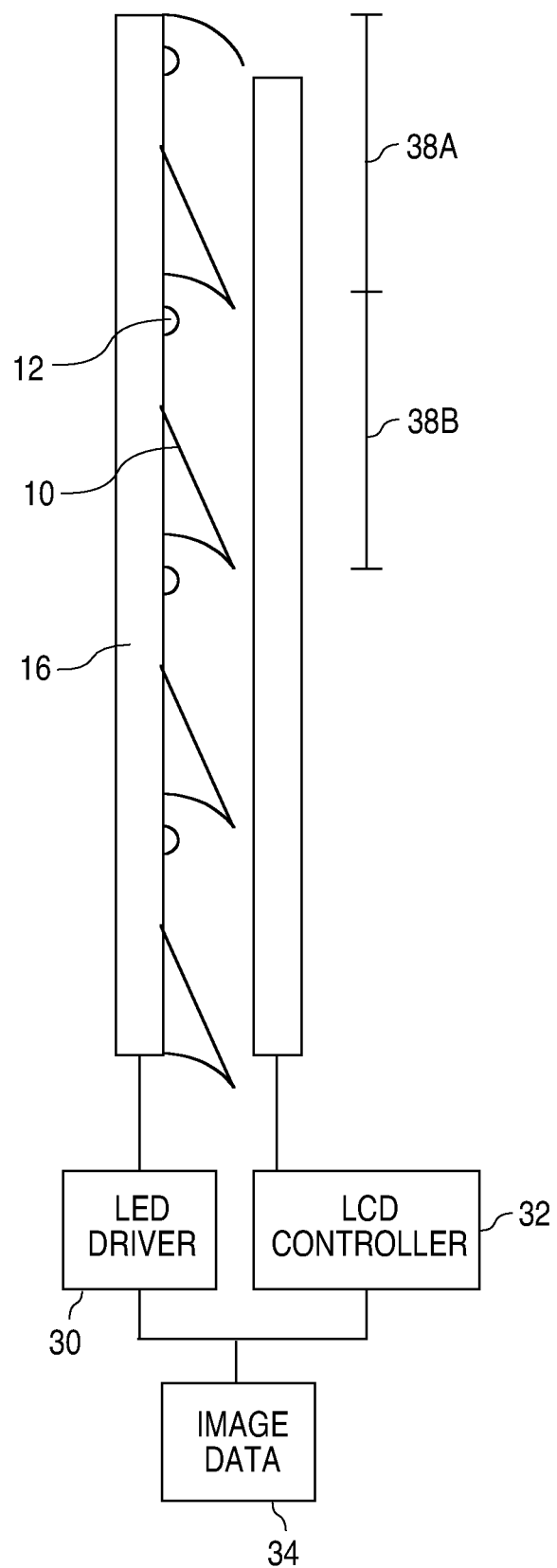
FIG. 5 illustrates a system for adjusting the brightness of each illumination segment for a given set of image data.

Illumination segments according to embodiments of the invention may have several advantages as backlights for displays. Such backlights are inexpensive, relatively thin, and simple to fabricate. Since the light sources are dispersed regularly through the backlight, the light sources may be individually controlled to adjust the brightness in different parts of the display, as illustrated in FIG. 5. Image data 34, which are provided to LCD controller 32 so LCD 26 can form the appropriate image, are also provided directly or indirectly to LED driver 30. For example, for a given image, the portion of the image corresponding to illumination module 38A may be darker, while the portion of the image corresponding to illumination module 38B may be brighter. LED driver 30 may receive that image data, and in response provide more power to illumination module 38B to produce more light, and less power to illumination module 38A to produce less light. Adjusting the brightness of each illumination module to correspond to the image data may improve the contrast and reduce the power consumption of the projector.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:
1. A structure comprising:
   a plurality of illumination modules, each illumination module comprising:
      a light source;
      a first reflective member that reflects light emitted from the light source; and
      a second reflective member that includes a reflective surface that includes a first portion and a second portion, wherein each portion reflects light that is reflected from the first reflective member, the first portion being more specular reflecting than the second portion and the second portion being more diffuse reflecting than the first portion; and
   a liquid crystal display panel disposed over the plurality of illumination modules.
2. The structure of claim 1 wherein the light source is disposed in a corner of the illumination module.
3. The structure of claim 1 wherein the light source is disposed on an edge of the illumination module.
4. The structure of claim 1 wherein the light source comprises at least one semiconductor light emitting diode.
5. The structure of claim 1 wherein the light source comprises at least one red-emitting semiconductor light emitting diode, at least one green-emitting semiconductor light emitting diode, and at least one blue-emitting semiconductor light emitting diode.
6. The structure of claim 1 wherein each illumination module in the structure has the same size and shape.
7. The structure of claim 1 wherein:
   a first illumination module is located proximate a center of the liquid crystal display panel;
   a second illumination module is located proximate an edge of the liquid crystal display panel; and
   the first illumination module has a smaller area than the second illumination module.
8. The structure of claim 1 wherein at least one illumination module is substantially square and between 50 and 100 mm long on a side of the square.
9. The structure of claim 1 wherein each illumination module has a thickness less than 20 mm.
10. The structure of claim 1 wherein the reflective member is curved.
11. The structure of claim 1 wherein the first portion is disposed between the light source and the second portion.
12. The structure of claim 1 further comprising a wavelength-converting material disposed on at least a portion of the reflective member.
13. The structure of claim 1 further comprising a wavelength-converting material spaced apart from the plurality of illumination modules.
14. The structure of claim 1 wherein:
   a first portion of the liquid crystal display panel is aligned over a first illumination module;
   a second portion of the liquid crystal display panel is aligned over a second illumination module; and
   the first illumination module is configured such that a portion of light emitted from the light source of the first illumination module is incident on the second portion of the liquid crystal display panel.
15. The structure of claim 14 wherein the plurality of illumination modules are configured such that between 5% and 60% of light incident on the first portion of the liquid crystal display panel is emitted from light sources other than the light source of the first illumination module.
16. The structure of claim 1 further comprising a diffuser disposed between the plurality of illumination modules and the liquid crystal display panel.
17. The structure of claim 16 wherein the diffuser is spaced between 0.5 to 10 mm from the plurality of illumination modules.
18. The structure of claim 16 wherein the diffuser is patterned.
19. A structure comprising:
   a plurality of illumination modules, each illumination module comprising:
      a light source;
      a first reflective member that reflects light from the light source; and
      a second reflective member that includes a reflective surface that includes a first portion and a second portion wherein each portion reflects light from the light source that is reflected by the first reflective member, wherein the first portion is more specular reflecting than the second portion and the second portion is more diffuse reflecting than the first portion; and
   a liquid crystal display panel disposed over the plurality of illumination modules.
20. The structure of claim 19 wherein:
   a first portion of the liquid crystal display panel is aligned over a first illumination module;

a second portion of the liquid crystal display panel is aligned over a second illumination module; and the first illumination module is configured such that a portion of light emitted from the light source of the first illumination module is incident on the second portion of the liquid crystal display panel.

21. A structure comprising:
a plurality of illumination modules, each illumination module including:
  a light source;
  a first reflective member that reflects light emitted from the light source in a first direction; and
  a second reflective member that includes a reflective surface that includes a first portion and a second portion, wherein each portion reflects the light from the first reflective member in a second direction that differs substantially from the first direction, the first portion being more specular reflecting than the second portion and the second portion being more diffuse reflecting than the first portion; and
a liquid crystal display panel disposed over the plurality of illumination modules.

22. The structure of claim 21, wherein the first direction is toward the liquid crystal display panel.

23. The structure of claim 21, wherein the first portion is closer to the first light source than the second portion.

24. The structure of claim 21, wherein the second portion includes a printed diffusion pattern.

25. The structure of claim 21, wherein the second portion includes a corrugated diffusion pattern.

* * * * *